US 9,847,736 B2

(12) United States Patent
Grootjans et al.

(10) Patent No.: US 9,847,736 B2
(45) Date of Patent: Dec. 19, 2017

(54) DRIVER CIRCUIT FOR LEDS FOR TIME-OF-FLIGHT CALCULATION (75) Inventors: Riemer Grootjans, Antwerp (BE); Sebastien Resimont, Muizen (BE); Maarten Kuijk, Antwerp (BE)

(73) Assignee: SoftKinetic Sensors NV, Brussels (BE)

( * ) Notice: Subject to any disclaimer, the term of this patent is extended or adjusted under 35 U.S.C. 154(b) by 0 days.

(21) Appl. No.: 13/991,824

(22) PCT Filed: Jul. 12, 2012

(86) PCT No.: PCT/EP2012/063697
§ 371 (c)(1),
(2), (4) Date: Jun. 5, 2013

(87) PCT Pub. No.: WO2013/007787
PCT Pub. Date: Jan. 17, 2013

(65) Prior Publication Data
US 2014/0211192 A1    Jul. 31, 2014

(30) Foreign Application Priority Data
Jul. 14, 2011    (GB) .................................... 1112115.9

(51) Int. Cl.
*H02M 7/537*    (2006.01)
*H02M 7/42*    (2006.01)
*H05B 33/08*    (2006.01)
*G01S 17/10*    (2006.01)
*G01S 7/484*    (2006.01)
(Continued)

(52) U.S. Cl.
CPC ................ *H02M 7/42* (2013.01); *G01C 3/08* (2013.01); *G01S 7/484* (2013.01); *G01S 17/10* (2013.01); *H05B 33/083* (2013.01); *H05B 33/0815* (2013.01); *H05B 33/0818* (2013.01); *H05B 33/0824* (2013.01); *H05B 33/0848* (2013.01); *Y02B 20/347* (2013.01)

(58) Field of Classification Search
CPC ................ H02M 3/156; H02M 3/158; H02M 2001/007; H02M 7/53; H02M 7/537; H02M 7/539; H05B 41/26; H05B 41/28; H05B 41/282
USPC ......... 323/222, 225, 266; 315/185 R, 209 R, 315/210, 250, 291, 294, 324; 345/82
See application file for complete search history.

(56) References Cited

U.S. PATENT DOCUMENTS 3,944,854 A    3/1976    Keller
5,736,881 A    4/1998    Ortiz
(Continued)

FOREIGN PATENT DOCUMENTS

GB    2172120    9/1986

*Primary Examiner* — Gary L Laxton
(74) *Attorney, Agent, or Firm* — Wolf, Greenfield & Sacks, P.C.

(57) ABSTRACT

An electronic driver circuit for LEDs and LASERs is provided for use in time-of-flight applications featuring a high efficiency of energy-conversion and a high precision of distance-measurements based on a dual conversion circuit. A voltage to voltage DC-DC conversion is hereby merged with a DC-voltage to pulsed-current booster, this booster operating at a time-of-flight modulation frequency. At the start of a new measurement cycle, the PWM signal for driving the DC-DC conversion is updated in response to currents observed during previous illumination periods.

18 Claims, 6 Drawing Sheets (51) Int. Cl.
  *G01C 3/08* (2006.01)
  *H02M 3/158* (2006.01)

(56) References Cited

U.S. PATENT DOCUMENTS

| | | | |
|---|---|---|---|
| 6,275,018 B1* | 8/2001 | Telefus et al. | 323/282 |
| 7,439,945 B1* | 10/2008 | Awalt et al. | 345/83 |
| 8,058,817 B2* | 11/2011 | Lipcsei | H05B 33/0815 315/209 R |
| 8,148,907 B2* | 4/2012 | Sadwick | H05B 33/0815 315/246 |
| 2009/0189539 A1* | 7/2009 | Deng et al. | 315/294 |
| 2010/0244737 A1* | 9/2010 | Madhani | G01S 7/4814 315/297 |
| 2010/0283322 A1 | 11/2010 | Wibben | |
| 2011/0204797 A1* | 8/2011 | Lin et al. | 315/161 |

* cited by examiner

(a) Boost Converter (b) Charge Pump

FIGURE 7

PRIOR ART

DRIVER CIRCUIT FOR LEDS FOR TIME-OF-FLIGHT CALCULATION

CROSS-REFERENCE TO RELATED APPLICATIONS

This application is a §371 national stage entry of International Application No. PCT/EP2012/063697, filed Jul. 12, 2012, which claims priority to British Patent Application No. GB 1112115.9 filed Jul. 14, 2011, the entire contents of which are incorporated herein by reference.

TECHNICAL FIELD OF THE INVENTION

The present invention relates to an electronic driver circuit for a load especially for light sources of which light emitting diodes (LED) or OLED's or lasers or laser diodes are examples. In particular, the present invention relates to a driver circuit for an illumination device for a range finding device, a time of flight camera, or a time of flight sensor as well as to an illumination device for such device or camera as well as to the device or camera itself.

BACKGROUND OF THE INVENTION

Optimal powering of light sources such as LEDs for time-of-flight (TOF) devices requires specialized regulators that minimize intensity variations, e.g. with battery voltage and uniform pulse output. For this purpose, there are two regulators types often used: inductor-based boost converters and capacitor-based charge-pump converters. Each regulator type has specific advantages/disadvantages.

Figure 7:
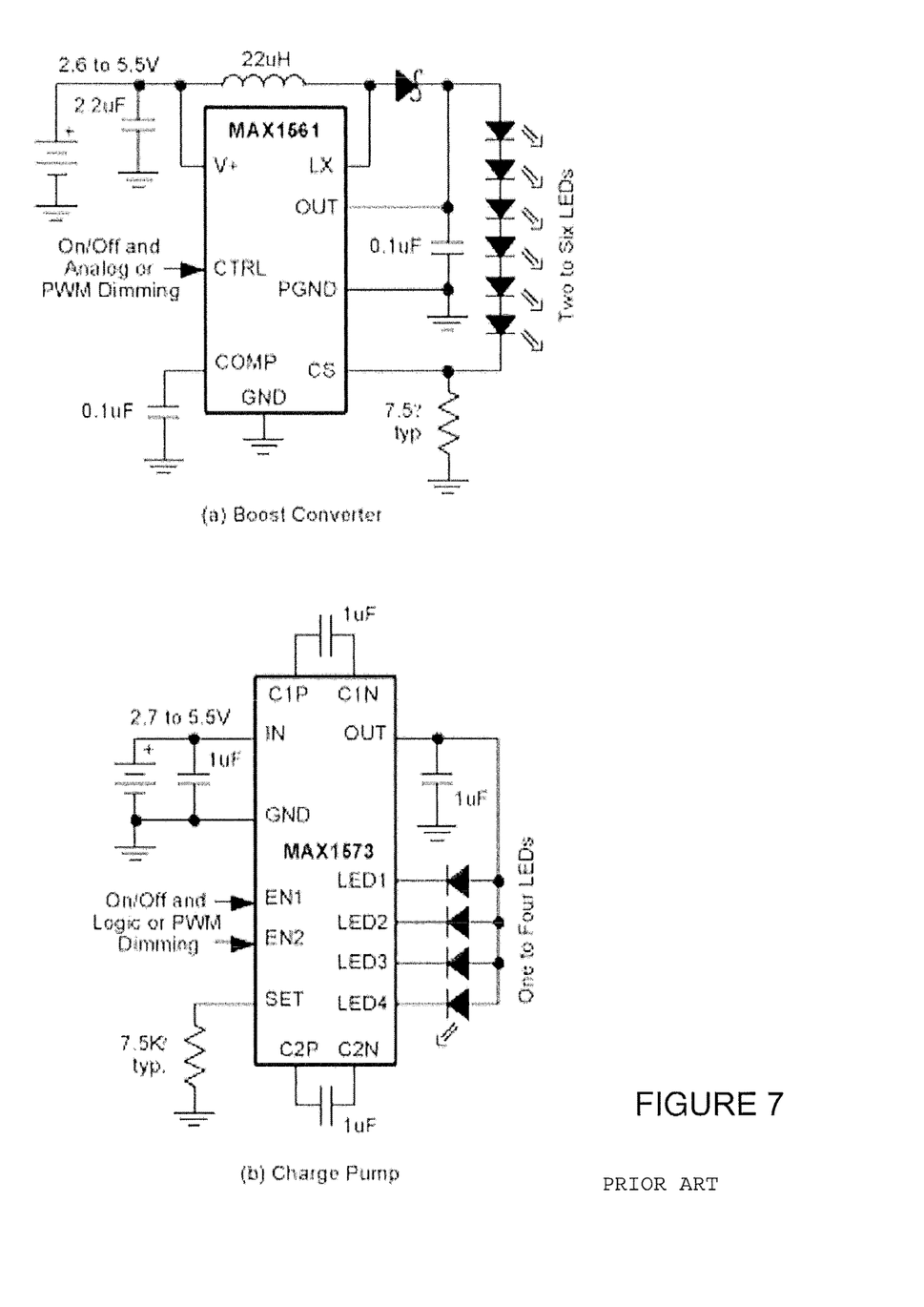
FIG. 7 shows a prior art boost converter and a charge pump for driving LED's.

Application note 3243 (http://www.maxim-ic.com/an3243) of Maxim Integrated Products describes a comparison between LED Boost Converters and Charge Pump circuits. This article compares state-of-the-art regulators, namely the MAX1561 boost converter versus the MAX1573 charge pump. FIG. 7 shows the boost converter and the charge pump of FIG. 1 of this document. The article suggests advantages for the charge pump.

A time of flight camera usually comprises an illumination device configured for illuminating an object, and a detection device configured for detecting light received from the illuminated object. The time of flight camera is configured for determining a phase difference between the light emitted by the illumination device and light reflected by the object and received by the detection device, in order to reconstruct an image of the illuminated object.

US 2011/0018451 A1 describes an light emitting diode (LED) driver circuit configured for driving a plurality of LED strings which are arranged in parallel to one another and each of the LED strings comprising a plurality of LEDs connected in series to one another. The LED driver circuit comprises a voltage regulation loop and a current regulation loop for controlling an amount of light emitted by the plurality of LEDs. The voltage regulation loop and the current regulation loop are configured for controlling an amount of voltage inputted to the LED driver circuit with respect to a measured output voltage and a measured current of the LED strings, respectively.

SUMMARY OF THE INVENTION

It is an object of the present invention to provide an electronic driver circuit for a load especially for light sources of which light emitting diodes (LED's) or OLED's or lasers or laser diodes are examples. In particular, it is an object of the present invention to provide a driver circuit suitable for an illumination device for a range finding device, a time of flight camera, or a time of flight sensor as well as an illumination device for such device or camera as well as the device or camera itself.

It is an advantage of embodiments of the present invention to provide an electronic driver circuit for light sources such as LEDs, OLED's, LASERs and LASER diodes, for use in time-of-flight applications featuring a high efficiency of energy-conversion and a high precision of distance-measurements based on a dual conversion circuit.

In one aspect he present invention provides a boost converter circuit for use with a load and a DC power supply for conversion of DC power to a pulsed wave for driving the load, comprising: a DC-DC converter circuit comprising a terminal for receiving a DC voltage from the DC power supply, a first inductance, a charge storage device such as a capacitance and first and second switching means, the first inductance being coupled to the terminal; the first switching means being adapted to charge the charge storage device such as a capacitance from the inductance at a first frequency, and a DC voltage-AC current converter circuit comprising a second inductance coupled to the charge storage device such as the capacitance and third switching means for driving the inductance as a pulsed wave current source for the load at a second frequency, the second frequency being higher than the first frequency.

The second switching means can be diode means such as a diode or a diode circuit or it can be a switch which is adapted to switch from open circuit to conducting in the same situations as a diode. Diodes can also be incorporated in other electronic components. The capacitance can be a capacitor or a capacitor circuit or any other device with a suitable capacitance. The first and/or second inductances can be an inductor or an inductor circuit or any other device with a suitable inductance.

Preferably, fourth switch means are provided for interrupting current in the load. This has the advantage that light sources do not emit any light during dark periods, thus saving power.

Preferably, current sensing means for sensing the current in the load are provided. This can be a resistor in series with the load, for example.

Preferably, a feedback loop is provided for controlling the boost converter circuit in response to the output of the current sensing means. A negative feedback loop helps to maintain stability of operation.

Preferably, the feedback loop and the DC-DC converter circuit control the current in the load in response to the output of the current sensing means. An advantage is that the intensity of illumination can be controlled.

In a preferred embodiment the control of the current is by PWM control of the DC-DC converter circuit. PWM control allows precise and rapid control of the total amount of charge that is fed to the capacitor from the first inductor. This controls the amount of current that can be extracted from the capacitor by the second inductance.

Especially for applications where the current through the load must be kept constant over a certain time, the feedback loop can be adapted to control or modify the operation of the DC-DC converter circuit only at time intervals and hence not disturbing operations at other times.

The boost circuit is particularly well adapted to drive a load that is one or more light sources. This allows the circuit to be used with a display backlight, in TOF sensors or cameras, range finders, in optoelectronic transducers and converters, e.g. for use with optical fiber networks and other optical devices. The one or more light sources can be one or more light emitting diodes or lasers or laser diodes. The light sources can be supplied separately and are not necessarily part of the boost converter circuit.

Preferably the DC voltage-AC current converter circuit is adapted to only draw a DC current from the DC-DC converter circuit. This reduces EMI.

Preferably an output is provided for a PWM duty cycle value. This can be used to check if the duty cycle is within allowable limits.

Optionally the PWM control can have a start mode and a stop mode. This offers the advantage of ramping up current to the load at start and ramping down at stop thus allowing a graceful power up and down.

In a further aspect of the present invention a range finding device, camera or sensor can be adapted to determine a distance to an object by measuring light emitted by the one or more light sources and reflected by the object within measurement cycles, whereby the boost converter circuit is adapted to update the PWM control before a measurement cycle. This has the advantage that the update is not done during a measurement cycle which could render erroneous distance measurements.

Hence, according to an exemplary aspect of the invention, a driver circuit for an illumination device for a time of flight camera is provided. The driver circuit is connectable to an illumination unit configured for emitting light. The driver circuit comprises the DC-DC converter, a DC voltage-AC current converter circuit, an illumination unit, and a control unit configured for controlling the DC-DC converter in response to a signal indicative of an amount of the light emitted by the illumination unit. The DC-DC converter is connectable to a power supply and configured for supplying power to the DC voltage-AC current converter circuit in the form of a pulse generator connected in series to the DC-DC converter and configured for converting the output of the DC-DC converter to a pulse train, Accordingly, the driver circuit comprise a feedback loop or mechanism, in order to adjust the amount of light emitted by the illumination unit based on an actual amount of the emitted light in that the control unit is configured for controlling the DC-DC converter in response to (and particularly based on) a control signal indicative of the amount of light emitted by the illumination unit.

The operation of the feedback loop may be restricted to certain time intervals which are preferably synchronized to the timing of the measuring cycles.

The DC-DC converter may be configured as a buck regulator, a voltage step up or boost converter or a buck-voltage step up regulator. Here, a buck regulator may be configured for down-converting a voltage inputted to the buck regulator. A voltage step up converter may be configured for increasing a value of an inputted voltage to the voltage converter. A buck-voltage step up regulator may be configured for down-converting and/or up-converting an inputted voltage value. Thus, the driver circuit may employ a commercially available electronic component for the voltage adaption such that the driver circuit may comprise low manufacturing costs.

The pulse generator may comprise an energy storage element such as an inductor, a switch and a ground plane, wherein the energy storage element, the switch, and the ground may be connected in series to one another, and wherein the switch may be connected in parallel to the illumination unit. The switching of the switch may allow to connect the energy storage element with ground via the switch or via the illumination unit. During a time in which the energy storage element may be connected to ground via the switch, a charging of the energy storage element may be accomplished. Further, during a time in which the energy storage element may be connected to ground via the illumination unit, a discharging of the energy storage element and thus an emission of light by the illumination unit may be accomplished. Accordingly, the energy storage element may be pre-loaded prior to the emission of the light by the illumination unit, whereby the illumination unit may be supplied with energy at once, and a rise time of the light emitted by the illumination unit may be significantly shortened. Thus, a fast start and/or end of an emission of the light by the illumination unit may be accomplished, and a waveform of the emitted light may comprise a sharp rising and/or falling edge. The latter may be particularly favorable in connection with a time of flight camera, which may determine a phase difference between the emitted light and the reflected light. Further, the amplification unit may comprise a constructively simple and inexpensive design.

The driver circuit may further comprise a monitoring unit including a current sensing means configured for monitoring a current through the illumination unit and configured for supplying the signal indicative of the amount of the emitted light based on the monitored current. The monitoring unit may be arranged and/or connected downstream of the illumination unit. Accordingly, a precise feedback mechanism between an actual amount of emitted light and the voltage inputted to the illumination unit may be accomplished.

The control unit may be configured for generating a control signal based on the signal indicative of the amount of the emitted light and for supplying the generated control signal to the DC-DC converter. Thus, an accurate control of an output voltage of the DC-DC converter may be enabled, in order to precisely impact the amount of the light emitted by the illumination unit. A value of the output voltage of the DC-DC converter may be increased and/or decreased based on the control signal.

The illumination unit is configured for emitting light pulses, wherein the control unit may be configured for generating the control signal in association with (and based on) a set of emitted light pulses. The control signal may be generated or updated subsequent to the set of light pulses for the controlling of future light pulses to be emitted. Thus, the controlling of the amount of emitted light may be based on timely averaged information, such that an accurate controlling of the amount of emitted light may be accomplished.

The illumination unit may comprise at least one element selected from the group consisting of a light emitting diode (LED), an OLED, a laser, and a laser diode. The illumination unit may comprise a plurality of the latter mentioned element(s).

The control unit may be configured for integrating a time dependent waveform of the signal indicative of the monitored current, particularly the waveform of the monitored current, associated with the set of the emitted light pulses. Further, the monitoring unit may be configured for comparing the integration value with a reference value for the determination whether to execute a control of the DC-DC converter. Thus, the control signal may comprise a single value for the time period associated with the set of the light pulses, thereby basing the controlling of the voltage converter on a "digital" signal and facilitating a signal processing during the controlling of the voltage converter. The set of the emitted light pulses may be associated with a frame of the light emission, and may comprise four light pulses.

The illumination unit may comprise a plurality of light sources, wherein each of the light sources may be configured for emitting light pulses, wherein the light sources may be connected in series to one another. Thus, the light sources may be arranged in a string or a branch being connected in parallel to the switch of the pulse generator. Thus, a simple design of the illumination device may be accomplished. Further, a uniformity of the light emitted by each of the light sources may be accomplished in that a sufficient amount of current is supplied to each of the light sources via the DC-DC converter and the pulse generator.

The illumination unit may comprise a plurality of light sources arranged in a plurality of parallel strings, wherein each string of the plurality of strings may comprise at least two light sources. Each string may be arranged in parallel to a switch. Further, scalability of the illumination device and thus of the emitted light may be facilitated in that the plurality of strings may be adapted to provide a desired amount of emitted light. Further, a uniformity of the light emitted by each of the light emitting elements may be accomplished in that the amount of current is set and monitored for each of the plurality of strings.

The control unit of the driver circuit may be configured for controlling the DC-DC converter based on information indicative of a start of a determination cycle of the detection device, wherein the determination cycle may be associated with a determination of a (single) phase difference. A determination cycle may be associated with one or more illumination and detection cycles of the illumination device and the detection device, respectively, with each illumination and detection cycle comprising, for example, 1,000 frames each of which comprises four light pulses.

The detection device may be configured for supplying a signal to the control unit, wherein this signal is indicative of the start of the determination cycle of the phase difference. Thus, a direct feedback mechanism between the detection device and the illumination device may be accomplished, thereby facilitating the controlling of the amount of emitted light of the illumination unit of the illumination device.

Alternatively, the control unit of the driver circuit may comprise an incremental counter configured for counting a number of generated control signals and for comparing the counted number with a predefined value associated with the determination cycle. Upon exceeding the predefined value, the start of a new determination cycle may be indicated.

DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where an indefinite or definite article is used when referring to a singular noun e.g. "a" or "an", "the", this includes a plural of that noun unless something else is specifically stated. In the different figures, the same reference signs refer to the same or analogous elements. The illustrations in the figures are schematic.

The term "comprising", used in the claims, should not be interpreted as being restricted to the means listed thereafter; it does not exclude other elements or steps. Thus, the scope of the expression "a device comprising means A and B" should not be limited to devices consisting only of components A and B. It means that with respect to the present invention, the only relevant components of the device are A and B.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

An aspect of the present invention is a voltage to voltage (DC-DC) conversion circuit coupled to a DC-voltage to Pulse booster especially for use with a display backlight, in TOF sensors or cameras, range finders or in optoelectronic transducers and converters e.g. for use with optical fiber networks and other optical devices. In the following the present invention will be described with reference to a range finding device or a TOF camera or sensor but the present invention is not limited thereto. The output of the light sources can be accurate and "clean" pulses such as square wave pulses that provide a high signal to noise ratio. The DC-voltage to Pulse booster, for example, can be operated at frequencies used in optical telecommunications or for time-of-flight detection modulations. The driver according to the present invention can be used with an optoelectronic coupler in a laptop or PC, for example, such as to connect to an optical fiber network.

For example, the determination of distance using the time-of-flight principle is done by measurements on the received signal reflected off an object. At the start of a new measurement cycle, a switched control signal such as a PWM signal for driving the DC-DC conversion can be updated in response to currents observed during a or the previous illumination period.

Figure 1:
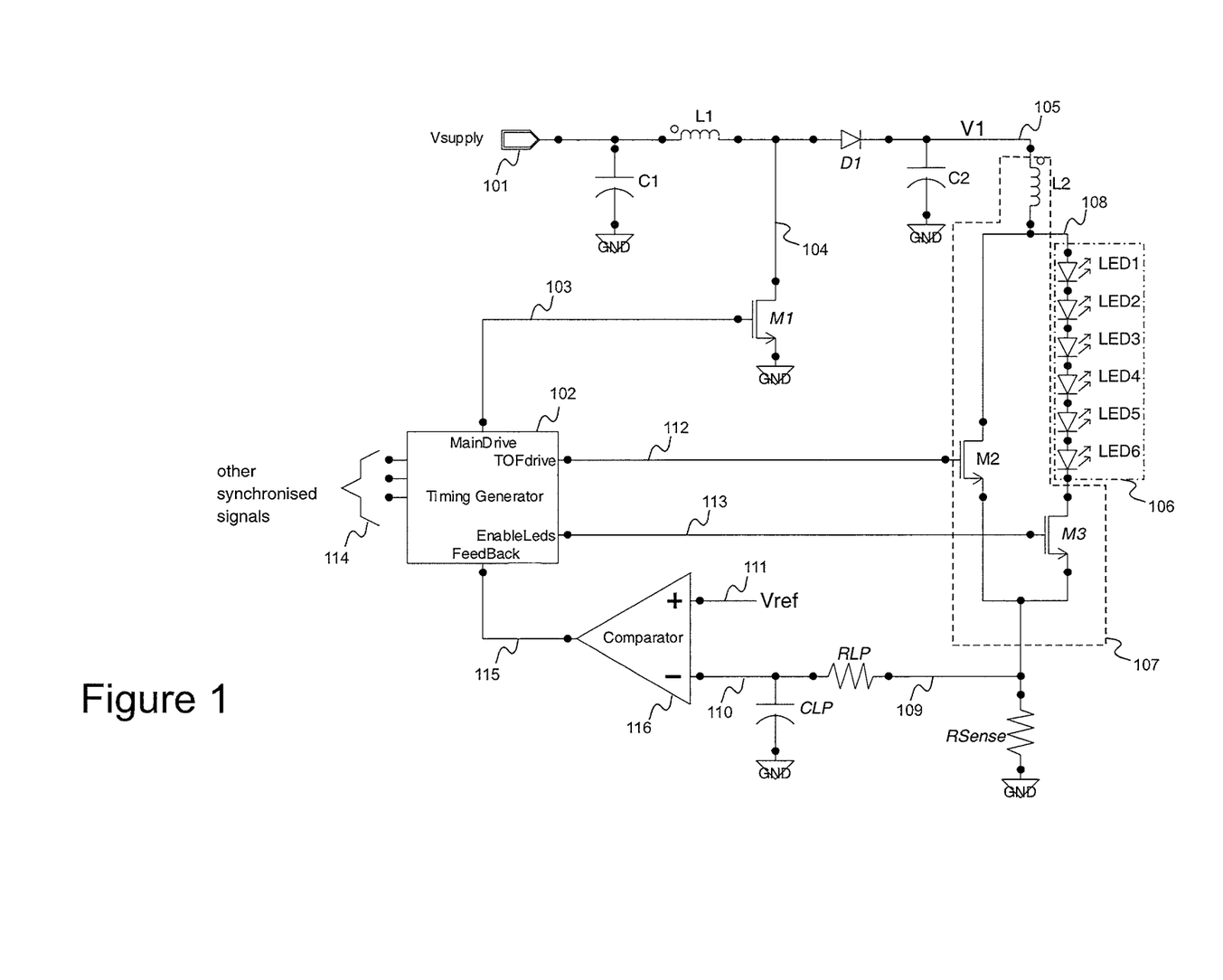
FIG. 1 shows a schematic representation of driver circuit according to the preferred embodiment of the present invention

Node 101 in FIG. 1 is a power inlet for a proposed driver circuit in accordance with an embodiment of the present invention. The voltage Vsupply on this node can be from any suitable DC supply, for example 4 to 5V as in a USB powered device or from a battery, photovoltaic cell etc. A decoupling means is provided such as a capacitance as represented by capacitor C1 which serves as a decoupling capacitor for buffering the voltage on node Vsupply 101. C1 can be a capacitor or a capacitor circuit. The decoupling means can be part of a DC-DC conversion circuit that can be, for example, a boost converter circuit, a buck converter circuit or a buck-boost converter circuit. Any of these circuits can be according to state-of-the-art circuits but as modified with the novel features mentioned below. The DC-DC boost circuit may include controllable switching means such as a pulse-width-modulation system (PWM) 102 for driving a switch M1 that charges an energy storage device such as the conversion inductor L1. According to embodiments of the present invention, the way the PWM value is updated will deviate from the state-of-the-art as will be explained further-on.

The energy storage element in the form of the inductor L1 connected to a switch M1 which, in turn, is coupled to ground. The switch M1 can be configured as a field effect transistor comprising two main electrodes, e.g. a source and a drain and control electrode, e.g. a gate. One of the main electrodes, e.g. the source is connected to the inductor L1, and the other main electrode, e.g. the drain is coupled to ground. A varying voltage applied to the gate defines a switching frequency of switch M1.

In the embodiment of the present invention described with reference to FIG. 1, a DC-DC voltage conversion of the booster type is used as the example. The buck-boost and buck DC-DC conversion types are equally well useful and deliver same advantages as the boosting type used in the following explanation.

The voltage to voltage DC-DC conversion operates as follows. L1 is an inductor for the DC-DC boost circuit. The switching signal which can be a PWM-signal on node 103 drives an electronic switch which can be a transistor M1. This transistor M1 preferably has a low DC resistance (Rds ON) to limit the power losses when charging the inductor L1. When the signal on node 103 is HIGH it will pull node 104 to ground. During this period inductor L1 charges energy from Vsupply 101. When the signal on node 103 is LOW, M1 is non-conducting, and node 104 is no longer connected to or coupled to ground. Part of the charged energy in L1 will now be transferred to charge storage device such as a capacitor C2 through a suitable switch such as diode D1. If the diode D1 is replaced by a switch, efficiency can be increased further. Such a switch is driven in conductivity antagonistically with the switch M1, with no overlap. A diode usually has the disadvantage of a voltage drop, which can be avoided with an appropriately driven switch.

The charge storage device C2 may be a capacitor or a capacitor circuit or may be a capacitance associated with another device. The above sequence will result in a voltage on node 105, with a value V1. C2 is a charge storage device and a decoupling device that should have high enough a value and low enough equivalent series resistance. By applying a switched control modulation such as a PWM modulation on node 103, the power transferred to node 105 can be regulated. In this topology V1 will be larger than Vsupply on node 101. So one can speak of a DC-DC voltage boost. The frequency of switching M1 is for example in the 50 KHz to 2 MHz range. The frequency is at least an order of magnitude smaller than the frequency used in the following pulse generator, e.g. for the time-of-flight modulation. A person skilled in the art can implement similarly a voltage buck DC-DC converter, or a voltage buck-boost DC-DC converter.

Connected to node 105, is the DC voltage-Pulsed booster 107 with a load which can be light sources, e.g. series connected light sources. The light sources can be solid state light sources, LEDs 106, or OLED's or lasers or laser diodes arranged as a load, e.g. coupled in series. There can be a single string or multiple strings of light sources. The light sources can be supplied separately and are not necessarily part of the boost converter circuit.

The voltage across the light sources, e.g. LEDs will be alternatingly higher than V1, or close to zero volts. The light sources, e.g. LEDs 106 are to be turned ON and OFF with the modulation frequency, e.g. used for the time-of-flight measurement. The modulation is preferably a square wave. This frequency can be anywhere in the 5 MHz to 400 MHz range. For particular implementations, the time-of-flight modulation scheme can even be more complex, e.g. it can be constituted of a bit-sequence instead of repeated subsequent LOW-HIGH and HIGH-LOW transitions, e.g. being a repeated code-word or a pseudo random bit sequence. A second inductance such as inductor L2, possibly having a much smaller inductance than L1, is connected to the light sources, e.g. LEDs 106. The light sources, e.g. LEDs 106 can be one or more LEDs or OLED's or LASERs or laser diodes in series, e.g. used as the time-of-flight light source or as part of it. L2 is also connected to a switch M2 that can short-circuit light sources, e.g. LEDs 106 and provides a means for charging energy into the L2 inductor. The light sources are connected in parallel to a switch M2 and are arranged between the L2 inductor and ground. Switch M2 can be an electronic switch such as a transistor. The switch M2 can be configured as a field effect transistor comprising two main electrodes, e.g. a source and a drain and control electrode, e.g. a gate. One of the main electrodes, e.g. the source is connected to the inductor L2, and the other main electrode, e.g. the drain is coupled to ground. A varying voltage applied to the gate defines a switching frequency of switch M2.

In series with the light sources, e.g. LEDs 106 a third electronic switch M3 can be provided allowing disabling of the light sources, e.g. LEDs 106 during dark periods, e.g. when time-of-flight measurements are stopped. This typically happens each time the imaging array is read out. M3 can be a transistor. The switch M3 can be configured as a field effect transistor comprising two main electrodes, e.g. a source and a drain, and a control electrode, e.g. a gate. One of the main electrodes, e.g. the source is connected to the light sources, and the other main electrode, e.g. the drain is coupled to ground. A voltage applied to the gate defines whether M3 is conductive or switched off.

The voltage on node 108 will be boosted to a voltage that can be, for example, up to the double of the voltage V1 on node 105, providing room for driving multiple light sources, e.g. LEDs in series, increasing the overall efficiency of the system and making the delay between opening the switch M2 and the moment that light will be generated very much independent of the resistance of the load, e.g. the light sources such as driven LEDs, OLED's or lasers or laser diodes. This is important because variations in this delay will deteriorate the distance measurement precision in a range finder or TOF camera or sensor. Voltage V1 can be for example 8V, and the pulsing voltage at node 108 may go up to 15V. Node 109 is connected to one of the main electrodes of the switches M2 and M3 e.g. drains of switches M2 and M3, and to a monitoring circuit including a current sensor such as a very small current sensing resistor RSense whose other terminal is connected or coupled to ground. The voltage on node 109 should be kept low, e.g. at a few hundred millivolts This can be achieved by choosing a very small resistor Rsense and hence reducing the losses due to this sense resistor. Node 109 is further connected to other components of the monitoring circuit such as a low-pass filter, here exemplified by resistor RLP and capacitor CLP. The voltage on node 110 gives an average of the voltage on node 109, being an indication for the average current through the load such as through Rsense or through inductor L2. This voltage is compared by a comparator 116 to a reference voltage Vref on node 111, the comparison result being fed through node 115 to a timing generator 102. Adjusting this reference voltage allows controlling the current flowing through the light sources, e.g. LEDs, OLED's or LASERs or laser diodes.

The timing generator 102 drives the switches M1, M2 and M3 through nodes 103, 112 and 113 respectively. These switches are preferably power MosFets, but can also be bipolar transistors. M2 is driven with an oscillating signal on node 112 that is LOW when the light sources, e.g. LEDs 106 have to produce light, using the energy stored in L2 and that is HIGH when the inductor L2 is storing energy that it receives from C2. Preferably the signal on node 112 is DC-balanced, i.e. the average LOW time is 50% of the time, and the average HIGH time is the remaining 50%. The average current through the light sources, e.g. LEDs 106 is about 50% of the current through Rsense, but this is compensated by the fact that the voltage at node 108 during light emission can be about 2 times the voltage V1. When the switch M2 is conducting, the effective short-circuiting of the light sources, e.g. LEDs 106 (assuming that switch M3 is also conducting) helps turning off the emitted light by the light sources, e.g. LEDs 106 in a reproducible way, again adding to the measurement precision. The maximum voltage across RSense should be chosen small enough in order not to dissipate too much power in RSense, but much larger than possible offsets in comparator 116 allowing the comparator to generate meaningful signals on its output node 115.

The timing generator 102 may be configured for integrating a time dependent waveform of the signal indicative of the monitored current, particularly the waveform of the monitored current, associated with a set of the emitted light pulses. Alternatively, the timing generator may be adapted for receiving such an integrated value from another component. Further, the timing generator 102 may be configured for comparing the integration value with a reference value for the determination whether to execute a control operation. Thus, the control signal may comprise a single value for the time period associated with a set of the light pulses, thereby basing the controlling of the DC-DC voltage converter on a "digital" signal and facilitating a signal processing during the controlling of the DC-DC voltage converter. Alternatively, the timing generator may be adapted for receiving such a control signal from another component.

Figure 2:
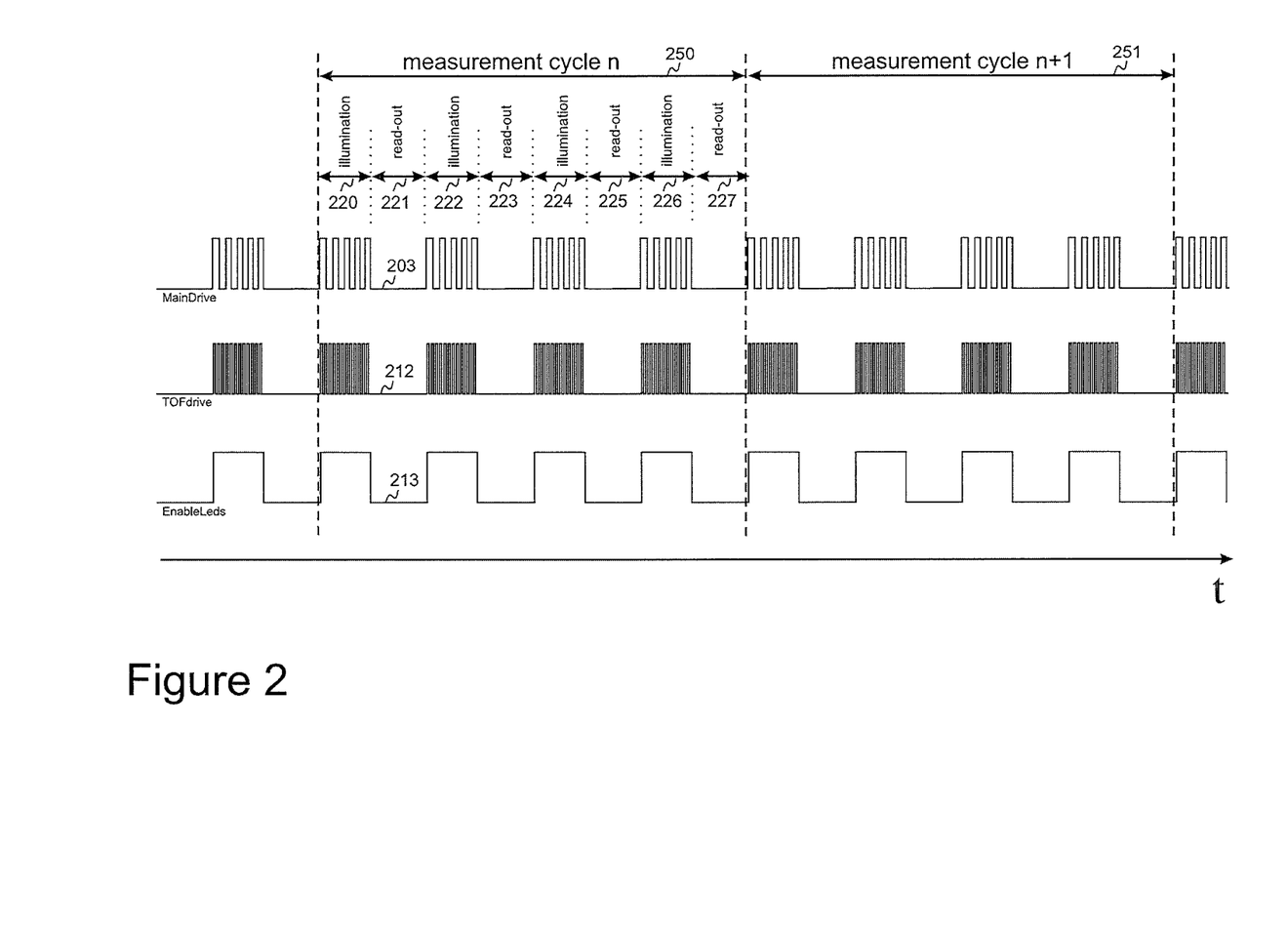
FIG. 2 illustrates the timing of the signals to drive the circuit in FIG. 1.

In actual time-of-flight sensors, one needs to perform several measurement periods before being able to perform a distance calculation. In FIG. 2, these illumination periods are numbered 220, 222, 224 and 226. A set of illuminations periods forms a measurement cycle 250. It is also possible to take these measurements at the same time in parallel if sufficient sensors are provided. In the case where the measurements are obtained sequentially one will perform a first illumination period 220, during which the received light is mixed with a signal that is in phase with the emitted light. This is then followed by a period 221 of readout of the sensor array, during which the modulated light is turned-off. This is then followed by a second 222, a third 224 and fourth 226 illumination period (or lees or more) during which the received light is mixed with e.g. 180 degrees phase shift, a 90 degrees phase shift and a 270 degrees phase shift respectively. Each of the illumination periods has its own readout period (numbered 221, 223, 225 and 227 respectively) as shown in FIG. 2. In a digital processor (not shown) all the readout results can be gathered and distances estimated. The timing generator 102 can also be connected to a time-of-flight sensor (not shown) for providing the various phase delays with respect to signal 212. It can also provide the signals mastering the readout process. This is indicated in FIG. 1 by "other synchronised signals" 114.

FIG. 2 further shows the signals 203, 212, and 213 on nodes 103, 112 and 113 driving the switches M1, M2 and M3 respectively. During the illumination periods 220, 222, 224 and 226, the DC-DC converter is receiving a constant PWM signal 203 on M1 by node 103, i.e. with a constant duty cycle.

Also switch M2 is receiving the time-of-flight modulation signal 212 turning the light sources, e.g. LEDs 1060N and OFF alternatingly at high-speed. Switch M3 is also conductive during these periods, which is in correspondence with the HIGH levels in the 213 curve that represents the signal on node 113.

During readout periods, all three driving signals 203, 212 & 213 have to be LOW, making sure that none of the switches e.g. transistors M1, M2 or M3 is in conduction. This keeps the light sources, e.g. LEDs 106 in the OFF state, without consuming power. During a full measurement cycle 250, the PWM signal on 203 has the same duty-cycle during the given four illumination periods. In this way, it is guaranteed that the light output remains of the same oscillating amplitude as much as possible. This is a requirement for high accuracy time-of-flight measurements. During one or more of the illumination periods 220, 222, 224, 226 within one measurement cycle, the timing generator can monitor the signal on the node 115 to discover whether on average, the current through Rsense is too LOW or too HIGH. Depending on its judgment, the duty-cycle of the PWM signal 203 can be updated at the start of the next measurement cycle. This will then lead to an adjustment of the voltage V1 on node 105 and subsequent to an adjustment of the current through Rsense and through the light sources, e.g. LEDs 106.

A possible set of components values is given in following table:

| Component/Variable | Possible Value |
| --- | --- |
| L1 | 4.7 uH |
| C1 | 10 uF |
| C2 | 5 caps in parallel (each of 200 nF) |
| L2 | 470 nH |
| Rsense | 0.33 ohms (Ω) |
| RLP | 100 ohms (Ω) |
| CLP | 1.5 nF |
| Vref | 130 mV |
| Vsupply | 5 V |
| Period of illumination | 1 ms |
| Period of readout | 1 ms |
| Measurement cycle period | 8 ms |

For achieving a higher light output power, loads with multiple branches such as light sources, e.g. LEDs, OLED's or LASERs or laser diodes can be driven in accordance with the principle of this invention. The DC power supply and the light sources can be supplied separately and are not necessarily part of the boost converter circuit.

Figure 3:
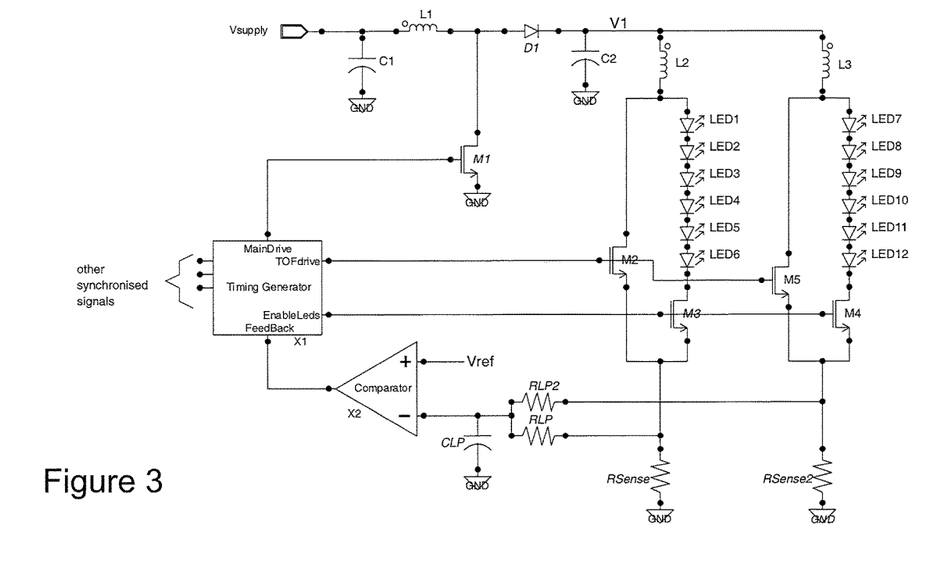
FIG. 3 shows a schematic representation of driver circuit according to a further preferred embodiment of the present invention driving two set of LEDs/Laser branches.

FIG. 3 shows an example that has in addition to the circuit of FIG. 1: an extra branch of light sources arranged in parallel, e.g. with an extra string of LED's: LED7, LED8, LED9, LED10, LED11 and LED12 that are also driven. More branches can be added. In this embodiment one extra inductor L3 is added per extra load branch, two extra switches, e.g. transistors M5 and M4 per extra load branch, a current sense means, e.g. resistor RSense2 per extra load branch and an averaging element such as a resistor RLP2. The switches M4 and M5 can be configured as field effect transistors, each comprising two main electrodes, e.g. a source and a drain and control electrode, e.g. a gate. For M4, one of the main electrodes, e.g. the source is connected to the inductor light sources, and the other main electrode, e.g. the drain is coupled to ground and a monitoring circuit. A voltage applied to the gate defines whether M4 is conducting or not. For M5, one of the main electrodes, e.g. the source is connected to the inductor L3, and the other main electrode, e.g. the drain is coupled to ground and a monitoring circuit. A varying voltage applied to the gate defines a switching frequency of switch M5.

In this embodiment it assumed that the all the light sources, e.g. LEDs are about the same type, leading to about the same current for a given V1, allowing to work with a common first DC-DC voltage boosting circuit.

Various alterations can be made to any of the embodiments described above, all of which are included within the scope of the present invention. For example, whereas instead of the DC-DC converter receiving a constant PWM signal 203 on M1 by node 103, i.e. with a constant duty cycle, during a start up or turn off mode, timing generator 102 may ramp up and ramp down the PWM duty cycle so as to provide a graceful start and stop, respectively. Also it can be useful to provide an output of a value related to the duty cycle in use. This can be used to check if the duty cycle is within suitable limits.

The DC voltage-AC current converter circuit can be adapted to only draw a DC current from the DC-DC converter circuit. This reduces EMI.

Any of the above embodiments may be used with a time of flight sensor or camera or a range finding device. In addition to the light sources mentioned above a detection device is provided and configured for detecting light and for determining a phase difference between the emitted light and the detected light, wherein the above described embodiments of the present invention can be used as a control unit, e.g. configured for controlling based on information indicative of a start of a measurement cycle of the detection device. The measurement cycle used for a determination of a phase difference between emitted and received light. Thus, light uniformity of the light sources may be accomplished during a measurement cycle of the detection device A measurement cycle may be associated with one or more illumination and detection cycles with each illumination and detection cycle comprising, for example, 1,000 frames each of which comprising four periods of light pulses.

Figure 4:
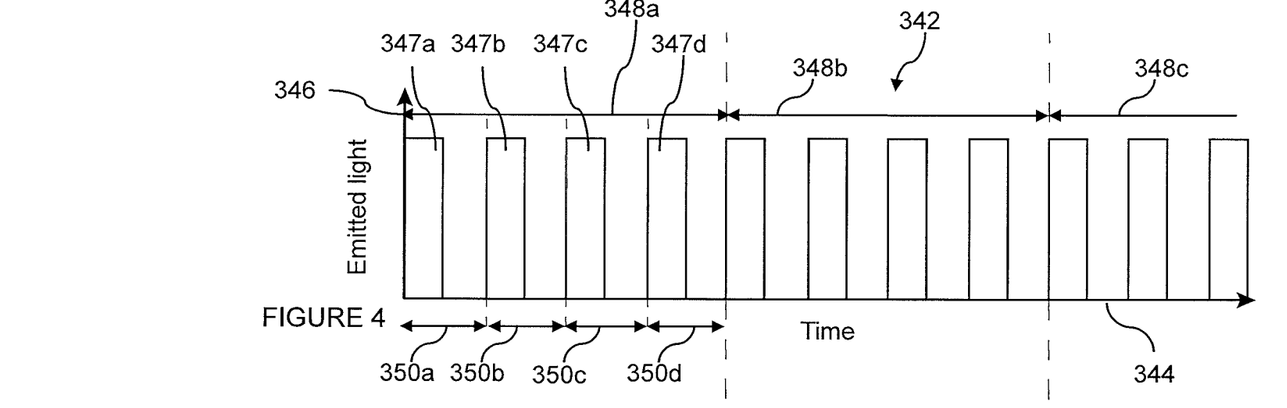
FIG. 4 shows a time dependency of light pulses emitted by the light sources.

Referring to FIG. 4, a time dependency of the light pulses emitted by the plurality of light sources is illustrated. A graph 342 of FIG. 4 comprises an abscissa 344 indicating a time (in arbitrary units) and an ordinate 346 indicating an amount of the emitted light (in arbitrary units). The light pulses 347a-d comprise a step like waveform, and are assigned to frames 348a-c. Each frame 348a-c comprises four light pulses 347a-d. A large number such as a thousand frames are combined in one illumination cycle of the illumination device 102. The illumination and detection cycles are identically defined with respect to one another. Each light pulse 347a-d is associated to a "quad" 350a-d defined by a time period associated to the emission of the light pulses 347a-d (non zero value of the waveform) and a time period associated to a dead time of the plurality of light emitting elements 332a-e (zero value of the waveform).

Since the discharging of the inductor L2 and/or L3 is executed immediately subsequent to setting the switch M2 and/or M5 in a switched-off state, the emitted light pulses 347a-d are generated immediately subsequent to the switching process and comprise sharp rising edges. Since the current supplied to the plurality of light sources is interrupted when the switch M2 and/or M5 is set in its switched-on state, the light emission is suddenly interrupted, and the light pulses 347a-d have a sharp falling edge. If the switching is executed for and at equidistant time intervals, then the power supplied to the plurality of light emitting elements 232a-f during each switching cycle is constant, and the emitted light is uniform.

The detection device may be configured for supplying a measurement signal to the boost converter circuit described above according to any of the embodiments of the present invention, wherein the measurement signal is indicative of the start of a measurement cycle of the phase difference. Thus, a direct feedback mechanism between the detection device and boost converter circuit may be accomplished, thereby facilitating the controlling of the amount of emitted light from the light sources.

Figure 5:
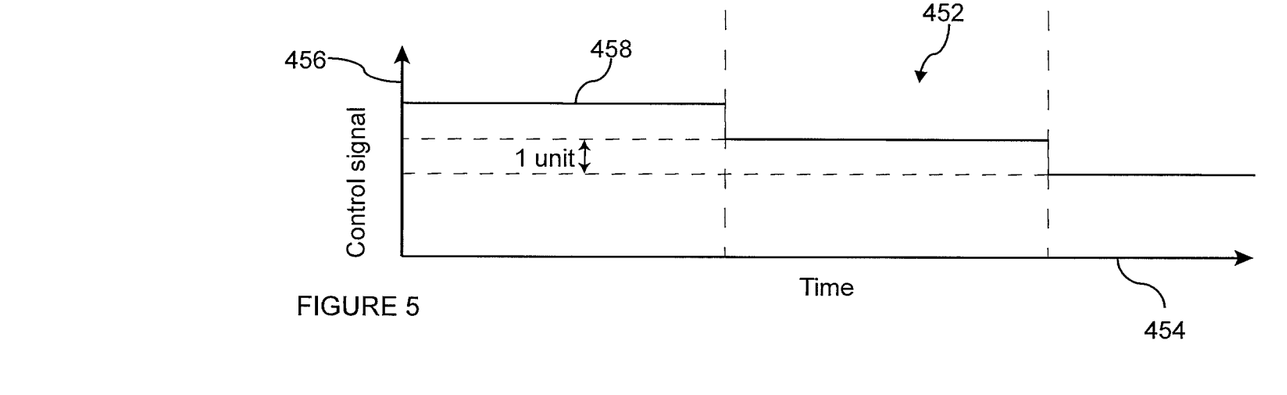
FIG. 5 shows a time dependency of a control signal to be supplied to a voltage converter circuit according to a further preferred embodiment of the present invention.

Referring to FIG. 5, a generation of the control signal based on the monitored current values will be explained in more detail. A graph 452 of FIG. 5 comprises an abscissa 454 indicating a time (in arbitrary units) and an ordinate 456 indicating the control signal (in arbitrary units) of the feedback loop. A curve 458 indicates the generated control signals. Similar to the amount of emitted light depicted in FIG. 4, the sensed current comprises a step-like waveform having a non-zero value during the time period of each quad 350-a-d of each frame 348a-c during which the light is emitted by the plurality of light sources. The monitored current is integrated as indicated by the signals emitted during the time period associated with one frame 348a-c, and the integration value is sampled for each frame time period. Accordingly, the control signal of the feedback loop comprises a step-like shape, and is configured as a digital signal being incremented in equal units. A value of the control signal is indicative of the amount of emitted light, and thus indicates to the timing generator 102 in combination with a stored reference value whether the voltage supplied to the plurality of light sources may have to be increased e.g. by a desired amount of the emitted light.

Alternatively, the timing generator 102 may comprise an incremental counter configured for counting a number of generated control signals and for comparing the counted number with a predefined value associated with the measurement. Upon exceeding the predefined value, the start of a new measurement cycle may be indicated.

In the above description with respect to FIGS. 1 and 3, timing generator 102 has been shown as a single unit. However, timing generator 102 has several outputs and any or all of these could be provided by individual timing circuits, linked for example by a single system clock.

Figure 6:
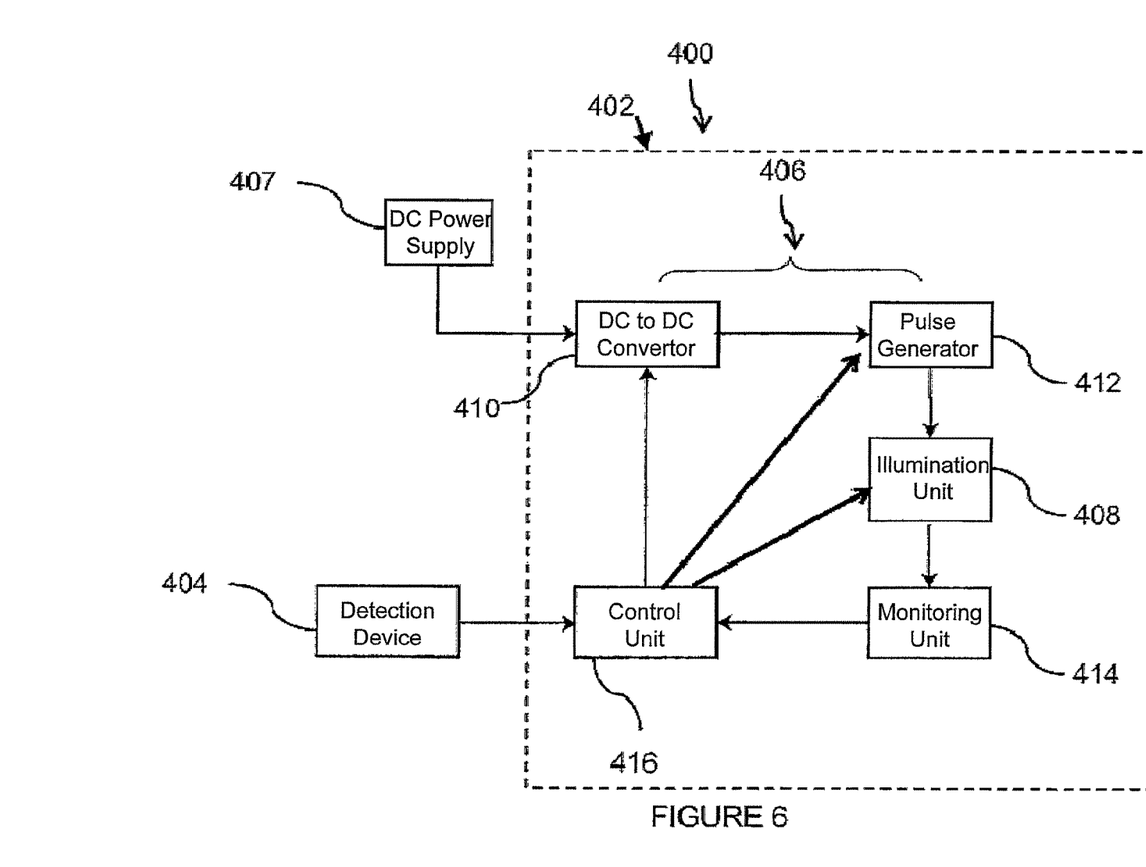
FIG. 6 shows a block diagram of a time of flight camera according to an exemplary embodiment of the present invention.

Referring to FIG. 6, the skilled person will appreciate that a time of flight camera 400 according to embodiments of the present invention, as described above, comprises an illumination device 402 configured for illuminating an object with light, and a detection device 404 configured for detecting light reflected from the object and for determining a phase difference between light emitted by the illumination device and the detected light. The detection device includes an optical sensor for receiving light. The camera can be adapted to determine a distance to the object on a pixel-by-pixel basis from the phase difference determined for each pixel of the camera. From this distance information a 3D image of the object can be generated.

The illumination device 402 comprises a driver circuit 406 which includes a DC-DC converter 410 such as described above. In embodiments described above, the DC-DC converter 410 has an energy storing element like inductor L1, a first switch like diode D1, a charge storage device like capacitor C1 and a second switch M1. A part of the function of timing generator 102 can be included in the DC-DC converter 410. The DC-DC converter circuit 410 is connectable to a DC power supply 407. The DC-DC converter 410 is configured for controlling light emission of the illumination device 402. Further, the illumination device 402 comprises an illumination unit 408 comprising a plurality of light sources arranged in strings, i.e. in series to one another, as described above. The light sources can be, for example, LED's, OLED's, lasers or laser diodes. The light sources can be supplied separately and are not necessarily a fixed part of the illumination device 402.

The DC power supply 407 is configured for supplying a direct current to the DC-DC converter 410 and to the illumination unit 408 and can be configured as well for supplying power to other components of the time of flight camera, for example, the detection device 404.

The driver circuit 406 comprises the DC-DC converter circuit 410 described above, implemented as a boost converter, a buck regulator or as a boost-buck converter. Further, the driver circuit 406 also comprises the DC voltage to AC current converter described above that is configured as a pulse generation circuit 412 connected downstream of the DC-DC converter 410 and configured for converting an output voltage of the DC-DC converter 410 to a pulse train, e.g. a square wave pulse train. The pulse generation circuit 412 drives the illumination unit 408. The pulse generation circuit 412 includes the switch M2 and/or M5 described above and also includes a part of the function of the timing generator 102.

A monitoring unit 414, comprising for example the current sensing means Rsense and the comparator 116 described above, is connected between the illumination unit 408 and a control unit 416 of the DC-DC converter 410. The control unit 416 includes a part of the function of the timing generator 102 described above. The monitoring unit 414 and the control unit 416 form a negative feedback loop to control the current through the illumination unit 408. The monitoring unit 414 is configured for monitoring a current through the illumination unit 408 and for generating a first signal indicative of the monitored current. Hence, this first signal is indicative of an amount of light emitted by the illumination unit 408. The control unit 416 is configured for controlling the DC-DC converter 410 and/or the pulse generator 412 in response to, and based on, the first signal generated by the monitoring unit 414.

Further, the control unit 416 is configured for controlling the DC-DC converter 410 and/or the pulse generator 412 in response to a second signal indicative of a start of a new determination cycle of the time of flight camera associated with the determination of the phase difference. To this end, the detection device 404 of the time of flight camera is configured for generating this second signal and for supplying this second signal to the control unit 416. In response to the second signal indicative of a start of a new determination cycle of the time of flight camera, an update of the current through the illumination unit 408 (that has been monitored by the monitoring unit 414) can be performed by control unit 416 and/or the pulse generator 412 before the start of the new determination cycle. By limiting updates to only before the start of a determination cycle, the illumination unit 408 is driven with stable conditions during a complete measurement cycle yielding one phase determination. It is important that for all of the determination cycle that is used to determine one phase measurement, that the illumination conditions remain constant.

While the invention has been illustrated and described in detail in the drawing and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. The mere fact that certain measures are recited in mutually different dependent claims does not indicate that a combination of these measures cannot be used to advantage. Any reference signs in the claims should not be construed as limiting the scope.

The invention claimed is:

1. A boost converter circuit for use with a DC power supply for conversion of DC power to a pulsed wave for driving a load, the boost converter circuit comprising:
   a DC-DC converter circuit comprising a terminal configured to receive a DC voltage from the DC power supply, a first inductive device, a charge storage device, a controller, and first and second switches, the first inductive device being coupled to the terminal, wherein the first switch is configured to selectively couple the first inductive device to the DC power supply and wherein the second switch is configured to selectively couple the first inductive device to the charge storage device, wherein the controller is configured to operate the first switch to charge the charge storage device at a first frequency;
   a DC voltage-AC current converter circuit comprising a third switch, a fourth switch, and a second inductive device, wherein the second inductive device is coupled to the charge storage device and the third switch, wherein the third switch is configured to drive the second inductive device as a pulsed wave current source for the load at a second frequency, the second frequency being higher than the first frequency, wherein the third switch is coupled between the second inductive device and ground; and
   a current sensor configured to sense a current provided to the load, wherein the current sensor comprises a current sensing resistor coupled in series with the load, wherein the current sensor is coupled between the third switch and ground, wherein the third switch is coupled between the second inductive device and the current sensor, and wherein the fourth switch is coupled between the load and the current sensor;
   wherein the controller is configured to control the current provided to the load in response to an output of the current sensor.

2. The boost convertor circuit of claim 1, wherein the controller is configured to control a current provided to the second inductive device in response to the output of the current sensor.

3. The boost convertor circuit of claim 1, wherein the third switch is connected in parallel with the load.

4. The boost convertor circuit of claim 1, wherein an arrangement of the charge storage device, the second inductive device, the load and the third switch is configured to boost the voltage over the load higher than the voltage over the charge storage device.

5. The boost converter circuit of claim 1, wherein the load comprises one or more devices selected from the group consisting of: light emitting diodes, organic light emitting diodes, lasers, and laser diodes.

6. The boost converter circuit of claim 1, wherein the second switch is a diode.

7. The boost converter circuit according to claim 1, wherein the controller is configured to operate the fourth switch to interrupt the current provided to the load.

8. The boost converter circuit of claim 7, wherein the controller is a pulse width modulation (PWM) controller configured to control the current provided to the load using pulse width modulation.

9. The boost converter circuit of claim 8, wherein the controller is configured to control the current provided to the load in response to an output of the current sensor only at time intervals.

10. The boost converter circuit of claim 1 wherein the DC voltage-AC current converter circuit is adapted to only draw a DC current from the DC-DC converter circuit.

11. The boost converter circuit of claim 8 further comprising an output for a PWM duty cycle value.

12. The boost converter circuit of claim 8 wherein the PWM controller is configured to have a start mode and a stop mode.

13. A range finding system, comprising:
a boost converter circuit comprising:
    a DC-DC converter circuit comprising a terminal configured to receive a DC voltage from the DC power supply, a first inductive device, a charge storage device, a controller, and first and second switches, the first inductive device being coupled to the terminal, wherein the first switch is configured to selectively couple the first inductive device to the DC power supply and wherein the second switch is configured to selectively couple the first inductive device to the charge storage device, wherein the controller is configured to operate the first switch to charge the charge storage device at a first frequency;
    a DC voltage-AC current converter circuit comprising a third switch, a fourth switch, and a second-inductive device, wherein the second inductive device is coupled to the charge storage device and the third switch, wherein the third switch is configured to drive the second-inductive device as a pulsed wave current source for a load at a second frequency, the second frequency being higher than the first frequency, wherein the third switch is coupled between the second inductive device and ground; and
    a current sensor configured to sense a current provided to the load, wherein the current sensor comprises a current sensing resistor coupled in series with the load, wherein the current sensor is coupled between the third switch and ground, wherein the third switch is coupled between the second inductive device and the current sensor, and wherein the fourth switch is coupled between the load and the current sensor;
wherein the controller is configured to control the current provided to the load in response to an output of the current sensor.

14. The range finding system of claim 13, wherein the load comprises one or more devices selected from the group consisting of: light emitting diodes, organic light emitting diodes, lasers, and laser diodes.

15. The range finding system of claim 13, wherein the load comprises one or more light sources, wherein the range finding system is adapted to determine a distance to an object by measuring light emitted by the one or more light sources and reflected by the object within measurement cycles, wherein the controller is a pulse width modulation (PWM) controller configured to control the current provided to the load using pulse width modulation, and wherein the boost converter circuit is adapted to update a PWM control value used by the PWM controller before a measurement cycle.

16. The range finding system of claim 15 wherein the controller is configured to control the current provided to the load at time intervals synchronized to a timing of the measurement cycles.

17. A boost converter circuit for use with a DC power supply for conversion of DC power to a pulsed wave for driving a load, the boost converter circuit comprising:
a DC-DC converter circuit comprising a terminal configured to receive a DC voltage from the DC power supply, a first inductive device, a charge storage device, a controller, and first and second switches, the first inductive device being coupled to the terminal, wherein the first switch is configured to selectively couple the first inductive device to the DC power supply and wherein the second switch is configured to selectively couple the first inductive device to the charge storage device, wherein the controller is configured to operate the first switch to charge the charge storage device at a first frequency;
a DC voltage-AC current converter circuit comprising a third switch, a fourth switch, and a second inductive device, wherein the second inductive device is coupled to the charge storage device and the third switch, wherein the third switch is configured to drive the second inductive device as a pulsed wave current source for the load at a second frequency, the second frequency being higher than the first frequency, wherein the third switch is coupled between the second inductive device and ground; and
a current sensor configured to sense a current provided to the load, wherein the current sensor comprises a current sensing resistor coupled in series with the load, wherein the current sensor is coupled between the third switch and ground, wherein the third switch is coupled between the second inductive device and the current sensor, and wherein the fourth switch is coupled between the load and the current sensor;
wherein the controller is configured to control the current provided to the load in response to an output of the current sensor.

18. The boost converter circuit of claim 17, wherein the load comprises one or more devices selected from the group consisting of: light emitting diodes, organic light emitting diodes, lasers, and laser diodes.

* * * * *